US012725317B2

(12) United States Patent
Zhu et al.

(10) Patent No.: US 12,725,317 B2
(45) Date of Patent: Sep. 1, 2026

(54) DOUBLE CAMERA STREAMS

(71) Applicant: Snap Inc., Santa Monica, CA (US)

(72) Inventors: Cai Zhu, Zhangjiajie (CN); Chuangwen Liu, Shenzhen (CN); Haoyun Wu, Rancho Palos Verdes, CA (US); Weihao Yuan, Shenzhen (CN)

(73) Assignee: SNAP INC., Santa Monica, CA (US)

(*) Notice: Subject to any disclaimer, the term of this patent is extended or adjusted under 35 U.S.C. 154(b) by 0 days.

(21) Appl. No.: 17/822,022

(22) Filed: Aug. 24, 2022

(65) Prior Publication Data

US 2023/0419559 A1 Dec. 28, 2023

Related U.S. Application Data

(63) Continuation of application No. PCT/CN2022/100392, filed on Jun. 22, 2022.

(51) Int. Cl.

*G06T 11/00* (2026.01)
*G06F 16/71* (2019.01)
*H04N 5/77* (2006.01)
*H04N 5/775* (2006.01)
*H04N 5/91* (2006.01)

(52) U.S. Cl.

CPC .............. *G06T 11/00* (2013.01); *G06F 16/71* (2019.01); *H04N 5/77* (2013.01); *H04N 5/775* (2013.01); *H04N 5/91* (2013.01)

(58) Field of Classification Search

None

See application file for complete search history.

(56) References Cited

U.S. PATENT DOCUMENTS 10,127,290 B1 11/2018 Armstrong et al.
11,030,814 B1 * 6/2021 Kwiatkowski ........ G06T 19/006
12,361,658 B2 7/2025 Zhu et al.
2009/0034937 A1 * 2/2009 Kusunoki .............. H04N 19/87 386/248

(Continued)

FOREIGN PATENT DOCUMENTS

CN 102810099 12/2012
CN 103035003 4/2013

(Continued)

OTHER PUBLICATIONS

"International Application Serial No. PCT/CN2022/100392, International Search Report mailed Dec. 26, 2022", 4 pgs.

(Continued)

*Primary Examiner* — Nurun Flora

(74) *Attorney, Agent, or Firm* — SCHWEGMAN LUNDBERG & WOESSNER, P.A.

(57) ABSTRACT

Image augmentation effects are provided on a device that includes a display and a camera. A first stream of image frames captured by the camera is received and an augmented reality effect is applied thereto to generate an augmented stream of image frames. The augmented stream of image frames is displayed on the display in real time. A second stream of image frames, corresponding to the first stream of image frames, is concurrently saved to an initial video file. The second stream of image frames can later be retrieved from the initial video file and the augmented reality effects applied thereto independently of the first stream of image frames.

16 Claims, 10 Drawing Sheets

(56) References Cited

U.S. PATENT DOCUMENTS

| | | | | |
|---|---|---|---|---|
| 2011/0053688 | A1 | 3/2011 | Crawford et al. | |
| 2014/0178029 | A1 | 6/2014 | Raheman et al. | |
| 2016/0127710 | A1* | 5/2016 | Saban | G11B 27/005 386/241 |
| 2017/0061567 | A1* | 3/2017 | Lim | G06T 1/60 |
| 2018/0124370 | A1 | 5/2018 | Bejot | |
| 2018/0336730 | A1* | 11/2018 | Bastian | G06T 15/503 |
| 2019/0025904 | A1 | 1/2019 | Armstrong et al. | |
| 2019/0370094 | A1 | 12/2019 | Louch et al. | |
| 2020/0265614 | A1* | 8/2020 | Jung | G06T 11/00 |
| 2020/0402262 | A1 | 12/2020 | Wrinch | |
| 2022/0100534 | A1 | 3/2022 | Golobokov et al. | |
| 2022/0141418 | A1 | 5/2022 | Voss | |
| 2022/0191454 | A1 | 6/2022 | Babu J D et al. | |
| 2022/0207840 | A1 | 6/2022 | Cansizoglu et al. | |
| 2022/0383597 | A1 | 12/2022 | Hill, II et al. | |
| 2024/0037882 | A1 | 2/2024 | Zhu et al. | |
| 2025/0316045 | A1 | 10/2025 | Zhu et al. | |

FOREIGN PATENT DOCUMENTS

| | | |
|---|---|---|
| CN | 105357451 | 2/2016 |
| CN | 107948543 | 4/2018 |
| CN | 108230448 | 6/2018 |
| CN | 111915744 | 11/2020 |
| CN | 114401442 | 4/2022 |
| JP | 2013050881 | 3/2013 |
| KR | 20200101235 A | 8/2020 |
| WO | 2024020908 | 2/2024 |

OTHER PUBLICATIONS

"International Application Serial No. PCT/CN2022/100392, Written Opinion mailed Dec. 26, 2022", 4 pgs.

"International Application Serial No. PCT/CN2022/108422, International Search Report mailed Dec. 21, 2022", 5 pgs.

"International Application Serial No. PCT/CN2022/108422, Written Opinion mailed Dec. 21, 2022", 4 pgs.

"U.S. Appl. No. 17/946,643, Non Final Office Action mailed Jun. 18, 2024", 11 pgs.

"U.S. Appl. No. 17/946,643, Response filed Sep. 17, 2024 to Non Final Office Action mailed Jun. 18, 2024", 7 pgs.

"U.S. Appl. No. 17/946,643, Non Final Office Action mailed Dec. 10, 2024", 13 pgs.

"European Application Serial No. 22947267.5, Response to Communication pursuant to Rules 161(2) and 162 EPC filed Jul. 24, 2025", 10 pgs.

"European Application Serial No. 22947267.5, Extended European Search Report mailed Jan. 30, 2026", 7 pgs.

"Korean Application Serial No. 10-2025-7002356, Notice of Preliminary Rejection mailed Jun. 2, 2026", w/ English translation, 14 pgs.

* cited by examiner

DOUBLE CAMERA STREAMS

CLAIM OF PRIORITY

This application is a continuation of International Application Serial No. PCT/CN2022/100392, filed Jun. 22, 2022, which is incorporated herein by reference in its entirety.

BACKGROUND

Social networking and messaging applications provide a vehicle for the sharing of user content such as photos or videos. In some instances, the photos or videos may be supplemented by augmented reality or other effects that are generated live on a camera feed and displayed on the display of a mobile device for preview. The user may be able to select and manipulate effects to apply to the live camera feed, and when satisfied with the results, capture an image or record a video including the effects. The captured video or photo can then be shared on the social networking platform.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
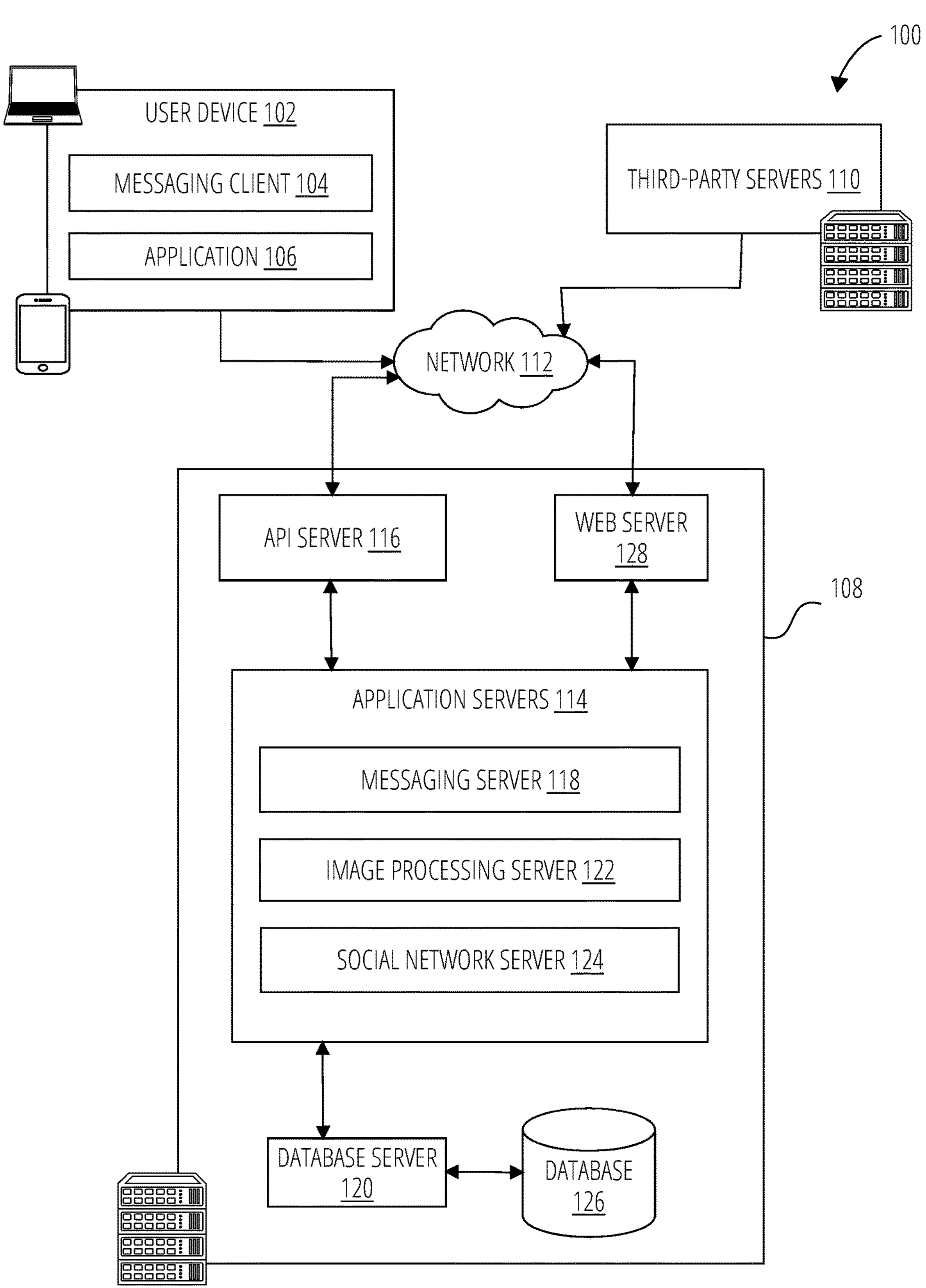
FIG. 1 is a diagrammatic representation of a networked environment in which the present disclosure may be deployed, in accordance with some examples.

Disclosed are systems and methods for providing improved video capture, display or forwarding in augmented reality (AR) devices.

As referred to herein, the term "augmented reality experience" includes or refers to various image processing operations corresponding to an image modification, filter, media overlay, transformation, and the like. In some examples, these image processing operations provide an interactive experience of a real-world environment, where objects, surfaces, backgrounds, lighting etc., in the real world are enhanced by computer-generated perceptual information. An augmented reality experience may also include associated audio, such as a soundtrack or effects sounds. In this context an "AR effect" comprises the collection of data, parameters, and other assets needed to apply a selected augmented reality experience to an image or a video feed. In some examples, augmented reality effects are provided by Snap, Inc. under the registered trademark LENSES.

AR effects are in use applied to a video stream captured by a camera in the AR device, to provide an enhanced user experience. The video stream may however also be used for a number of different purposes, including object detection and tracking, AR device position and orientation detection using image-processing techniques such as simultaneous localization and tracking, and QR code detection. The AR effects may be rendered onto the video stream for display to the user, for recording, and for forwarding to other users.

The demands placed on the AR device and on the video processing pipeline in the AR device can result in the video stream stuttering, which provides an undesirable user experience. This can negatively affect both local rendering of the AR-enhanced video stream to the AR device's display, as well as an AR-enhanced video that is recorded from the video stream for later viewing or for forwarding to other users. In particular, the demands of applying AR effects to the camera stream, rendering the AR-enhanced stream to the AR device's display (or "viewfinder") for viewing in real-time by the user, and rendering the AR-enhanced stream for recording, can result in the camera stream stuttering.

To address this, two camera streams are provided. The first stream is provided to the device display (or "viewfinder") for viewing in real-time by the user, while a second stream is provided directly to a video encoder for recording. By recording the second stream directly without also rendering it for display and without applying AR effects, the second stream is less likely to include any stuttering. Any stuttering that may occur on the independent first stream is thus also not reflected in the recorded video file. AR effects can then later be applied to the recorded stream when accessing the unenhanced video file, for example when played back for later viewing by the user, or when forwarding or streaming to other users.

In some examples, provided is a method, executed by one or more processors, for providing image augmentation effects on a device including a display and at least one camera, the method comprising receiving a first stream of images captured by the at least one camera; applying an augmented reality effect to the first stream of images captured by the at least one camera, to generate an enhanced stream of images; displaying the enhanced stream of images on the display; receiving a second stream of images corresponding to the first stream of images captured by the at least one camera; and saving the second stream of images to an initial video file.

The second stream of images may have a higher resolution than the first stream of images. The method may further comprise saving identifying information for the augmented reality effect with the initial video file.

In some examples, the method may further comprise retrieving the second stream of images from the initial video file; applying the augmented reality effect to the second stream of images to generate a further stream of enhanced images; and displaying the further stream of enhanced images on the display. The further stream of advanced images may then be saved as an enhanced video file.

The method may further comprise, after completion of the display of the further stream of enhanced images on the display: retrieving the second stream of images from the initial video file; applying the augmented reality effect to the second stream of images to generate a yet further stream of enhanced images; and saving the yet further stream of advanced images as an enhanced video file.

The method may still further comprise retrieving the second stream of images from the initial video file; applying the augmented reality effect to the second stream of images to generate a further stream of augmented images; and saving the further stream of augmented images to an enhanced video file. Retrieving of the second stream of images from the initial file may be initiated in response to playback user input, the method further comprising: retrieving the further stream of augmented images from the enhanced video file; and displaying the further stream of enhanced images on the display.

In some examples, provided is a non-transitory computer-readable storage medium, the computer-readable storage medium including instructions that when executed by a computer, cause the computer to perform operations for providing image augmentation effects on a device including a display and at least one camera, the operations comprising any of the methods and limitations as described above, including but not limited to receiving a first stream of images captured by the at least one camera; applying an augmented reality effect to the first stream of images captured by the at least one camera to generate an enhanced stream of images; displaying the enhanced stream of images on the display; receiving a second stream of images corresponding to the first stream of images captured by the at least one camera; and saving the second stream of images to an initial video file.

In some examples, provided is a computing device comprising at least one camera, a display, one or more processors, and a memory storing instructions that, when executed by the one or more processors, configure the device to perform operations for providing image augmentation effects, the operations comprising any of the methods and limitations as described above, including but not limited to receiving a first stream of images captured by the at least one camera; applying an augmented reality effect to the first stream of images captured by the at least one camera to generate an enhanced stream of images; displaying the enhanced stream of images on the display; receiving a second stream of images corresponding to the first stream of images captured by the at least one camera; and saving the second stream of images to an initial video file.

FIG. 1 is a block diagram showing an example messaging system 100 for exchanging data (e.g., messages, media and associated content) over a network. The messaging system 100 includes multiple instances of a user device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Application Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a user device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the user device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a user device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. The text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

The social network server 124 supports various social networking functions and services and makes these functions and services available to the messaging server 118. To this end, the social network server 124 maintains and accesses an entity graph within the database 126. Examples of functions and services supported by the social network server 124 include the identification of other users of the messaging system 100 with which a particular user has relationships or is "following," and also the identification of other entities and interests of a particular user.

Figure 2:
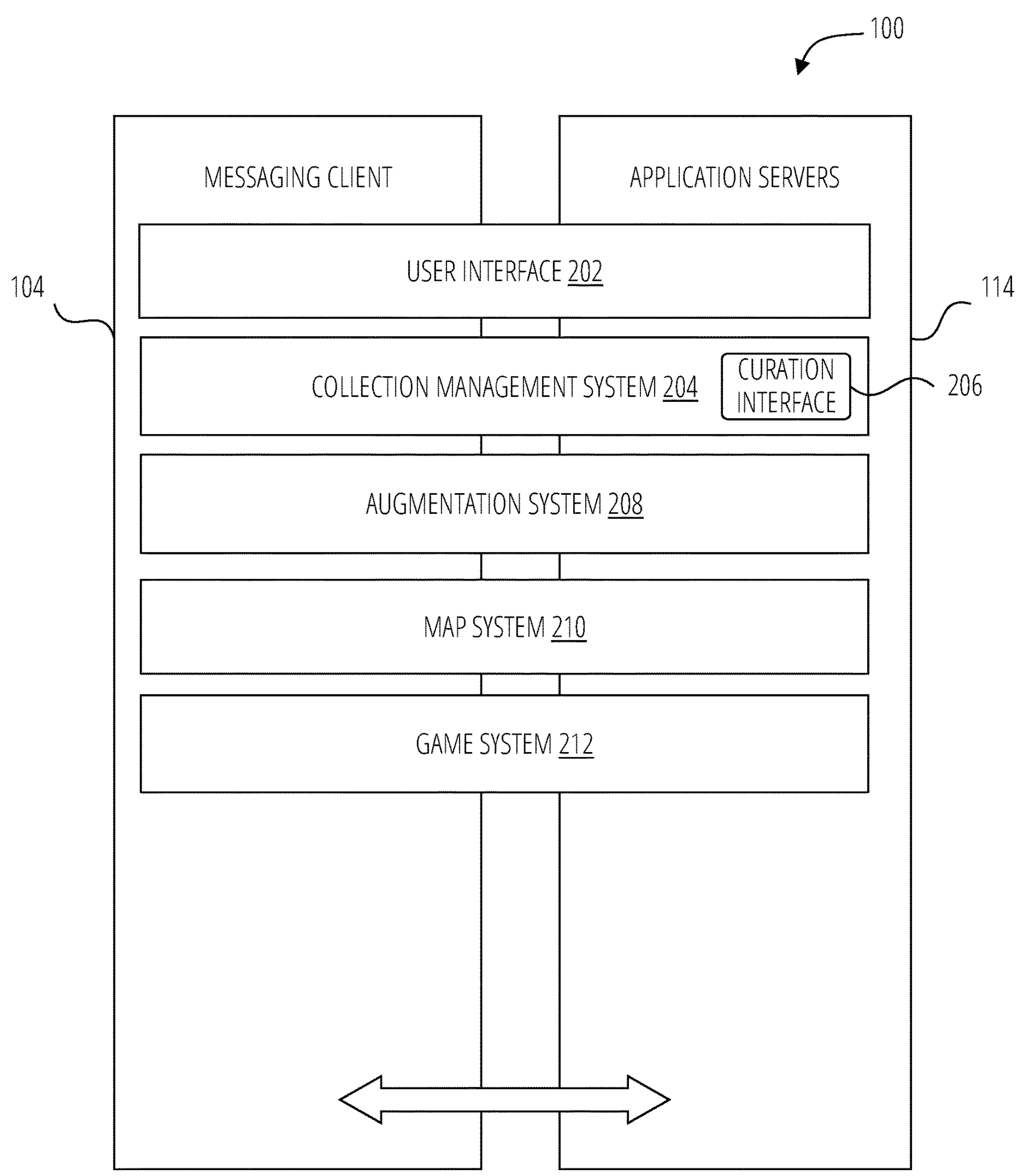
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever-side by the application servers 114. These subsystems include, for example, a user interface 202, a collection management system 204, an augmentation system 208, a map system 210, and a game system 212.

The user interface 202 is responsible for providing output to and receiving input from a user of the messaging client 104 on the user device 102. The user interface provides a user-manipulatable display output on a display (see further user output components 1026 in FIG. 10 and as described below) of the user device 102 as is known in the art. In one example, the user interface comprises a chat interface whereby a user can send and receive messages and associated content from one or more remote users. The user interface 202 also permits a user to manipulate live or captured media, for example by providing augmented reality effects on captured photos or videos, or on a live video feed from a camera of the user device.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the user device 102. In another example, the augmentation system 208 operatively supplies a media overlay to the messaging client 104 based on other information, such as social network information of the user of the user device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the user device 102. For example, the media overlay may include text or image that can be overlaid on top of a photograph taken by the user device 102. In another example, the media overlay includes an identification of a location overlay (e.g., Venice beach), a name of a live event, or a name of a merchant overlay (e.g., Beach Coffee House). In another example, the augmentation system 208 uses the geolocation of the user device 102 to identify a media overlay that includes the name of a merchant at the geolocation of the user device 102. The media overlay may include other indicia associated with the merchant. The media overlays may be stored in the database 126 and accessed through the database server 120.

The map system 210 provides various geographic location functions, and supports the presentation of map-based media content and messages by the messaging client 104. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

Figure 3:
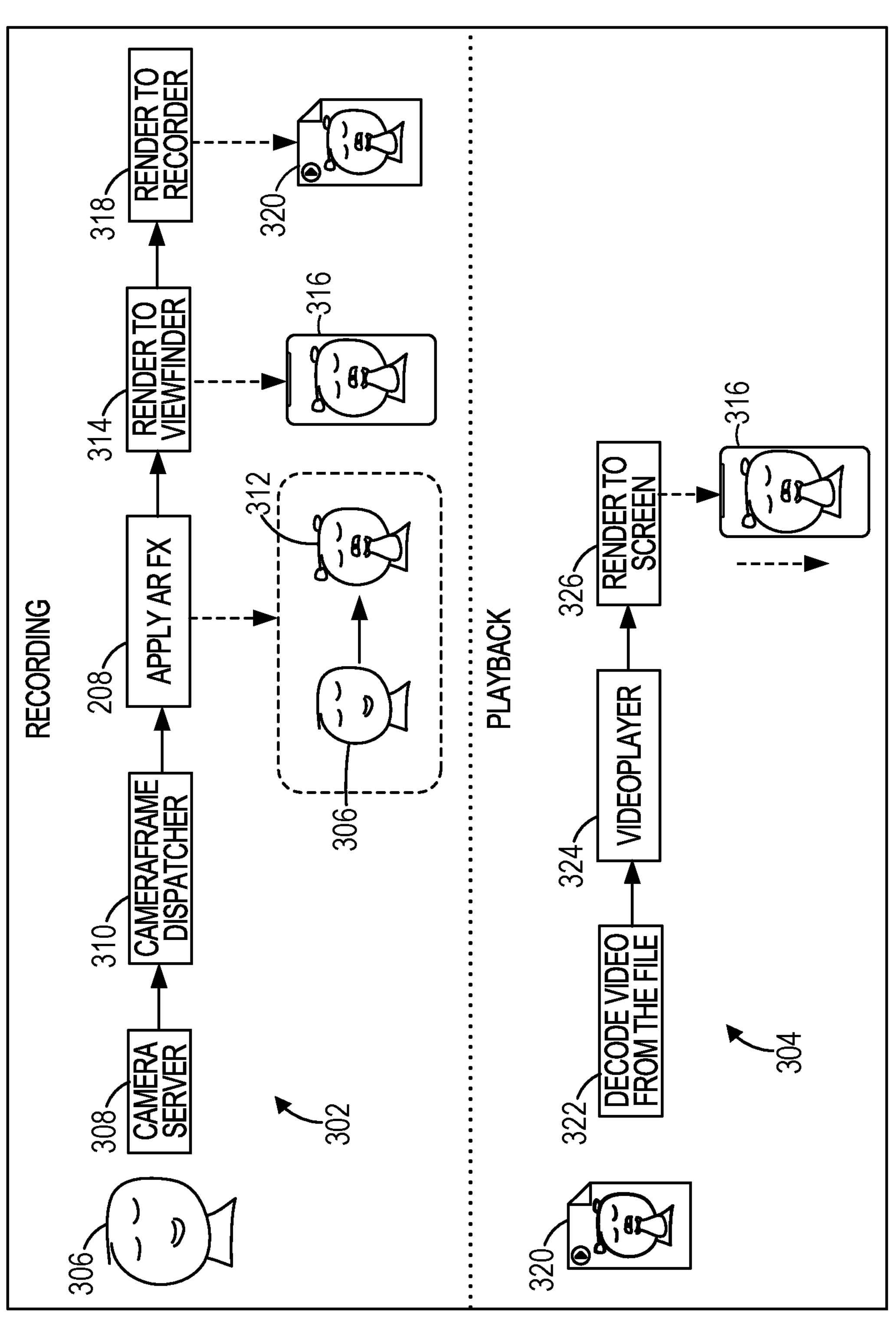
FIG. 3 shows a recording and display process flow and a playback process flow for an AR-enhanced video in a single camera stream implementation, according to some examples.

FIG. 3 shows a recording and display process flow 302 and a playback process flow 304 for an AR-enhanced video in a single camera stream implementation, according to some examples.

In the recording and display process flow 302, a camera server 308 receives a video stream of a user 306 that is generated by a camera on the user device. The camera server 308 passes the video stream to a camera frame dispatcher 310, which provides video frames to the augmentation system 208, which in turn applies augmented reality effects to the video frames and thus the video stream.

The enhanced video stream is then rendered for displaying on a viewfinder or display 316, in rendering operation 314. The enhanced video stream is then passed to a rendering operation 318, which records the video stream to an AR-enhanced video file 320.

For purposes of convenience, in the figures, the AR-enhanced user 312 that is depicted in the enhanced video stream or in an AR-enhanced video file 320 is shown as including the tongue, ears and nose of a dog, to distinguish from unenhanced video of the user 306.

In the playback process flow 304, the AR-enhanced video file 320 is retrieved and decoded by video decoder 322 and played back by video player 324, which renders the enhanced video stream in a rendering operation 326, for display on a display 316 as before.

Figure 4:
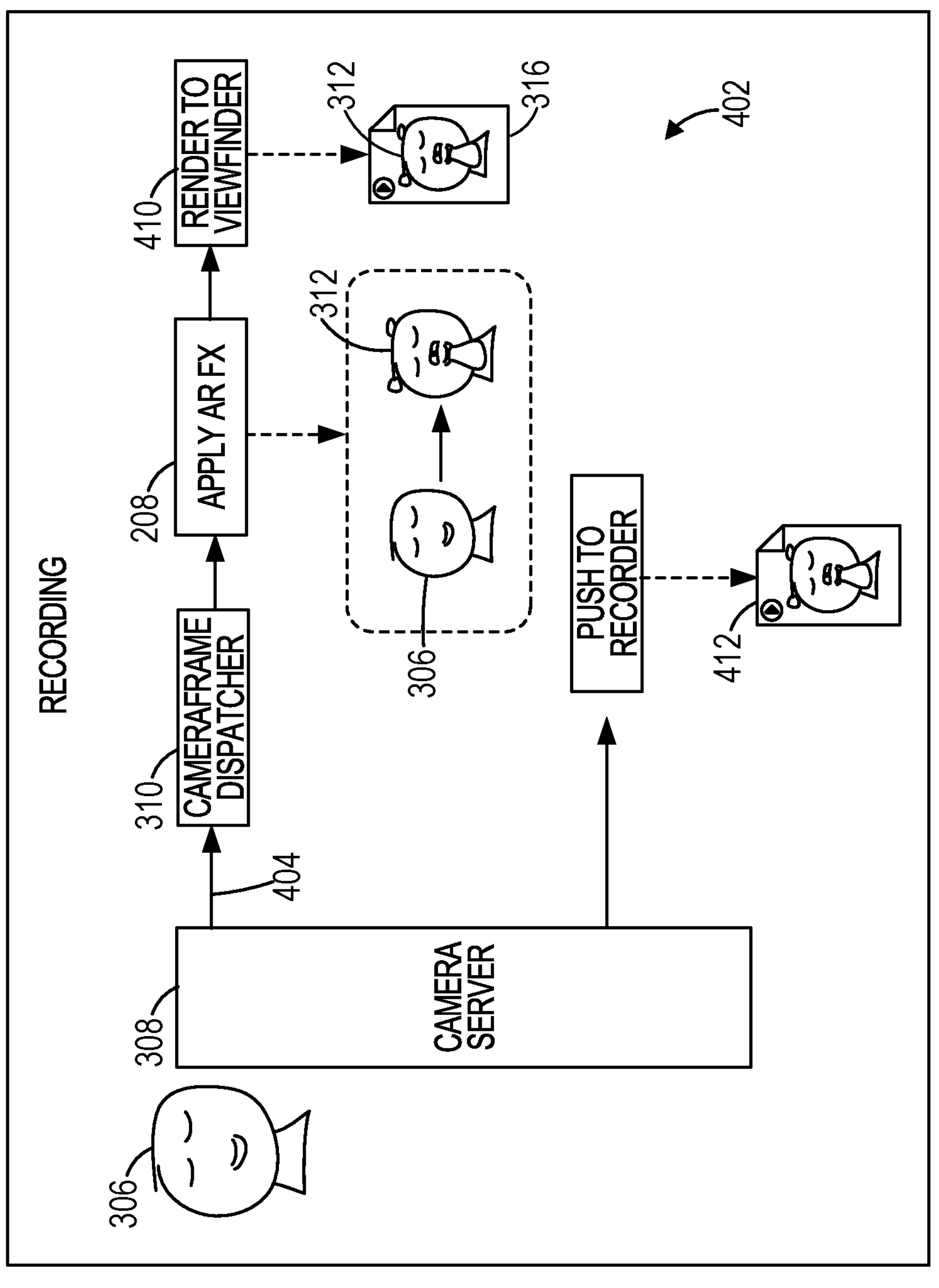
FIG. 4 shows a recording and display process flow for an AR-enhanced video in a double camera stream implementation, according to some examples.

FIG. 4 shows a recording and display process flow 402 for an AR-enhanced video in a double camera stream implementation, according to some examples.

In the recording and display process flow 302, the camera server 308 receives a video stream of a user 306 captured by a camera on the user device 102. The camera server 308 passes a first video stream 404 to a camera frame dispatcher 310, which provides video frames to the augmentation system 208. The augmentation system 208 applies augmented reality effects to the video frames and thus the video stream as was shown in the display process flow of FIG. 3. The enhanced video stream, including a depiction of the AR-enhanced user 312, is then rendered for displaying on a viewfinder or display 316, in rendering operation 410.

Unlike the display process flow 302 shown in FIG. 3, however, in the recording and display process flow 402, the camera server 308 also provides a second video stream 406 of the user 306. The second video stream 406 does not have any AR effects applied to it, and is provided to a video codec 408 that encodes and then saves an initial or unenhanced video file 412 to local or remote storage. Associated with the unenhanced video file 412 are descriptors that identify the AR effects and any associated parameters that were applied by the augmentation system 208 prior to displaying the AR-enhanced user 312 in display 316. These are associated with the unenhanced video file 412 for later use, for example by saving the descriptors and any associated parameters together with the unenhanced video file 412 as metadata, or in a separate file with a link or identifier between the separate file and the unenhanced video file 412.

Figure 5:
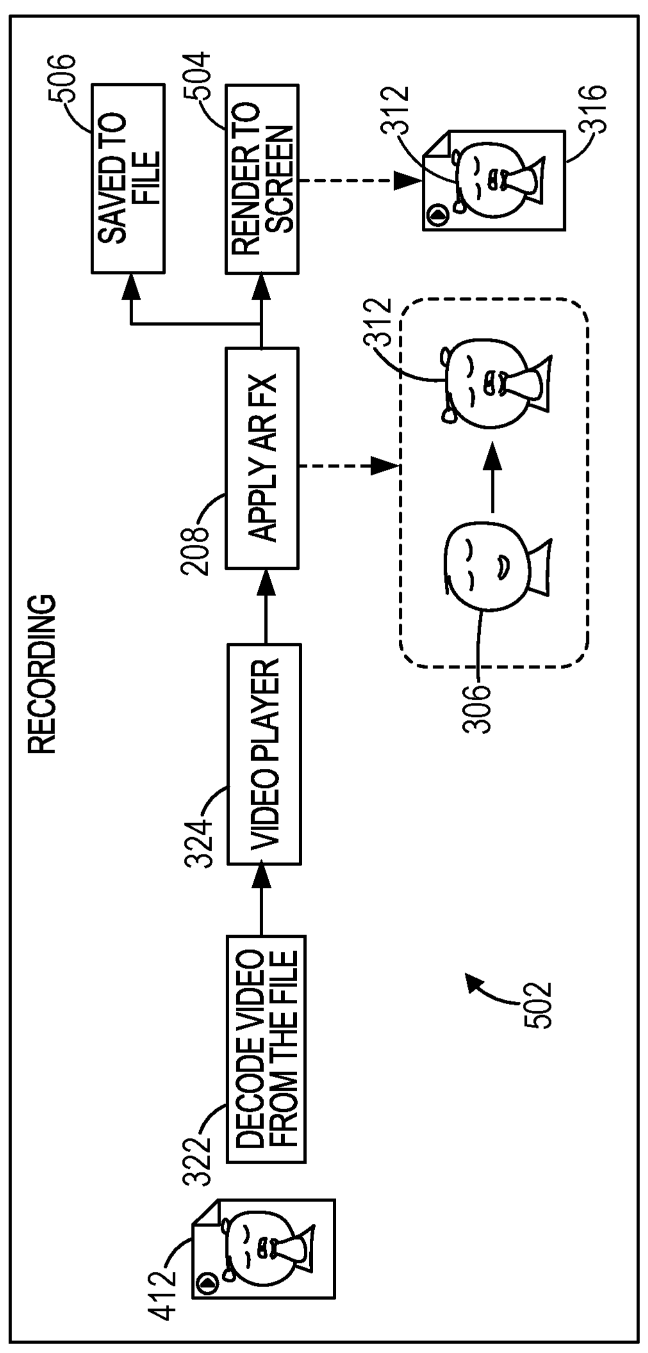
FIG. 5 shows a playback/re-recording process flow for an AR-enhanced video in a double camera stream implementation, according to some examples.

FIG. 5 shows a playback/re-recording process flow 502 for an AR-enhanced video in a double camera stream implementation, according to some examples. This process flow is initiated in response to the receipt of user input requesting playback of an enhanced version of the unenhanced video file 412 as the user believes it has been saved.

In the playback/re-recording process flow 502, the unenhanced video file 412 is retrieved and decoded by video decoder 322 and played back by video player 324 to generate an unenhanced video stream. The unenhanced video stream is provided to the augmentation system 208, which retrieves and applies the AR effects and any associated parameters that were previously used by the augmentation system 208 to provide the display 316 of the AR-enhanced user 312, as described in FIG. 4. The resulting video stream of the AR-enhanced user 312 is then provided to rendering operation 504 and is displayed by the display 316.

In addition or alternatively to displaying the AR-enhanced video stream on the display 316, the AR-enhanced video stream can be saved to a file 506.

As a further alternative to the display 316, the enhanced video stream can be streamed to a remote location such as the user device 102 of a remote user, or it can be transmitted to an activity feed on a social networking site or social networking application, or sent as a message to a remote user by the messaging client 104. This streaming or transmission can be in real time directly after application of the augmented reality effects by the augmentation system 208, or the saved file 506 can be transmitted.

By providing a separate recording and display process flow 402 and playback/re-recording process flow 502 in parallel process flows instead of in one serial flow, the frame rate and amount of stuttering can be improved in both the live display of the enhanced video stream, as well as in any subsequent display of the recording of the enhanced video stream.

The first video stream 404 and the second video stream 406 may be identical. However, in some examples, the first video stream 404 may be a lower resolution, computer-vision-grade video stream that is suitable for performing AR-related analyses, such as object detection, tracking, QR code recognition and so forth, while the second video stream 406 is a full resolution video stream that is more desirable for messaging and other social media applications. Capturing the first video stream 404 at a lower resolution reduces the overall computing resource usage associated with both capturing and processing of the first video stream 404.

However, the first and second video streams correspond, in that they reflect the same video subject, captured at the same time, in most but not all cases, by the same camera.

Figure 6:
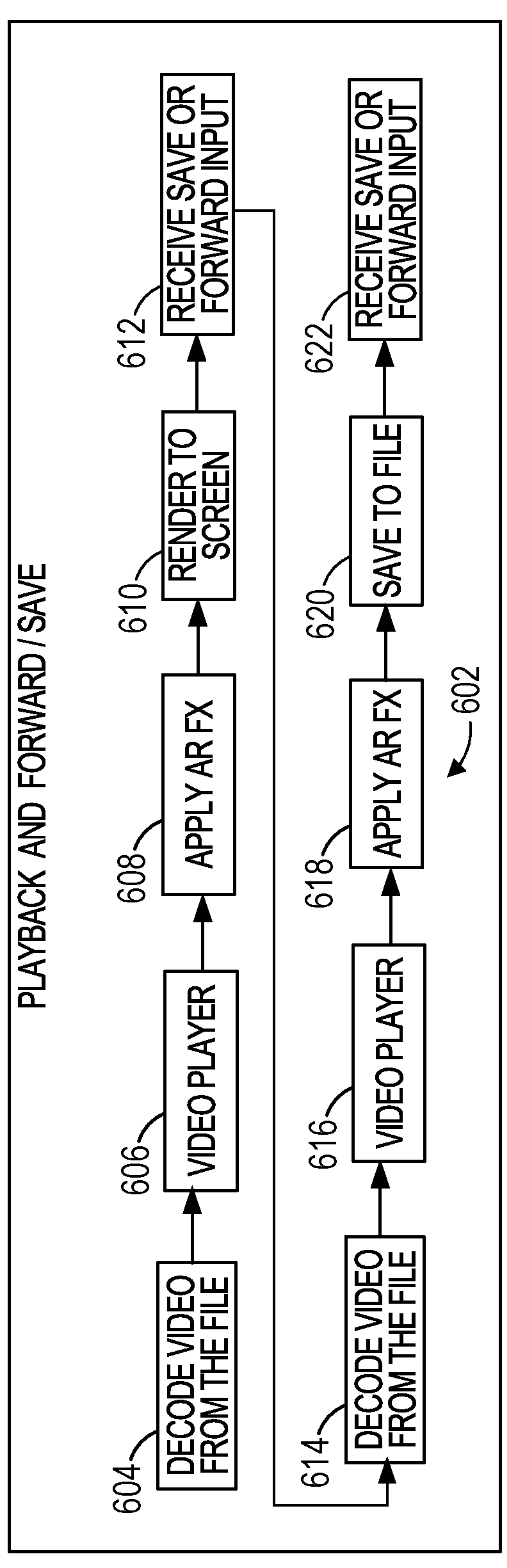
FIG. 6 shows a playback/re-recording process flow for an AR-enhanced video in a double camera stream implementation, according to some examples.

FIG. 6 shows a playback and forward/save process flow 602 for an AR-enhanced video in a double camera stream implementation, according to some examples. This process flow is initiated in response to the receipt of user input requesting playback of an enhanced version of the unenhanced video file 412 as the user believes it has been saved. In some cases the user will play the AR-enhanced video back for preview or review of the finished video for user approval, immediately after recording has been completed. The user may for example have just finished the recording, and be presented with "play," "save," "discard," and "forward" options.

In the playback and forward/save process flow 602, in response to receiving user input of the "play" option, the unenhanced video file 412 is retrieved and decoded by video decoder 322 in operation 604, and played back by video player 324 in operation 606 to generate an unenhanced video stream. The unenhanced video stream is provided to the augmentation system 208, which in operation 608 retrieves and applies the corresponding AR effects, based on the AR effect identifiers and any associated parameters that were previously used by the augmentation system 208 to provide the live display 316 of the AR-enhanced user 312, as described in FIG. 4. The resulting video stream of the AR-enhanced user 312 is then rendered to the display 316, in rendering operation 610, for viewing by the user.

However, unlike FIG. 5, the enhanced video stream received from the augmentation system 208 and rendered to the display in rendering operation 610 is not also saved directly to a file. Due to the real time requirements of applying the AR effects and rendering the enhanced video stream on the fly, there may be stuttering in the enhanced video stream as rendered for display to the user. Accordingly, the displayed version of the enhanced video stream is not saved for future viewing or forwarding as it was in FIG. 5. While stuttering in the enhanced video stream as initially displayed to the user is less desirable, the method of FIG. 6 has the advantage that the enhanced video stream can immediately be viewed/reviewed by the user upon completion of the recording.

Upon receipt of save or forward user input in operation 612, the unenhanced video file is decoded in operation 614, played back by the video player in operation 616, the AR effects are applied in operation 618, and resulting enhanced video stream is saved to a file in operation 620. Receipt of user input to save or forward the enhanced video stream may be received after display of the video in rendering operation 610 has been paused or has completed. Alternatively, user input to save or forward the enhanced video stream may be received up front, without playback of the enhanced video screen as described in operations 604 to 610. In such a case, the method commences at operation 612.

Since the enhanced video stream is not being displayed to the user, operations 614 to 618 do not need to be performed on the fly at a rate that will permit simultaneous video playback, but can instead be performed rigorously to ensure that there is no stuttering in the enhanced video stream as saved to a file in operation 620. This has the advantage that any future viewing of the enhanced video stream by the user or a recipient, as played back from an otherwise standard video file that already includes the enhanced video stream, will not have any stuttering.

If a forward input was received in operation 612, the file containing the enhanced video stream is then transmitted in operation 622 by the user device 102 to a remote location such as the user device 102 of a remote user, to an activity feed on a social networking site or social networking application, or as part of a message to a remote user by the messaging client 104, as specified in the forward user input. If a save input was received in operation 612, then the method ends at operation 620 with saving of the enhanced video file. Any further playback of the enhanced video will then be based on playback of this file and not on operations 604 to 612, avoiding the potential stuttering issue that may be associated with these operations.

Figure 7:
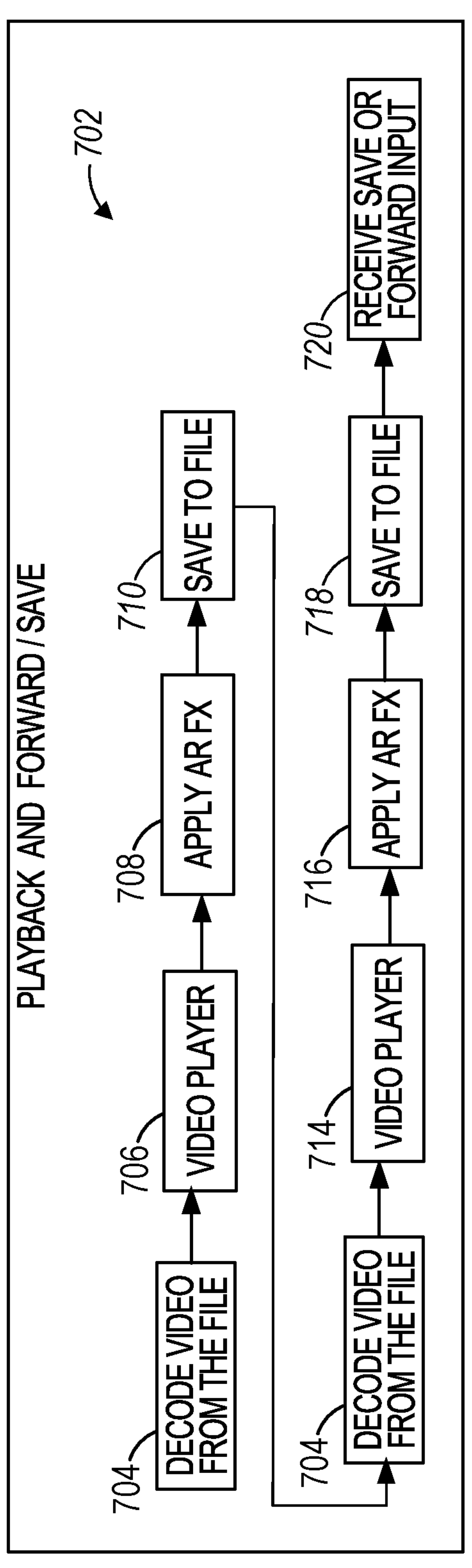
FIG. 7 shows a playback/re-recording process flow for an AR-enhanced video in a double camera stream implementation, according to some examples.

FIG. 7 shows a playback and forward/save process flow 702 for an AR-enhanced video in a double camera stream implementation, according to some examples. This process flow is initiated in response to the receipt of user input requesting playback of an enhanced version of the unenhanced video file 412 as the user believes it has been saved, in some cases for preview or review of the finished for user approval, immediately after recording has been completed.

In the playback and forward/save process flow 702, the unenhanced video file 412 is retrieved and decoded by video decoder 322 and played back by video player 324 to generate an unenhanced video stream. The unenhanced video stream is provided to the augmentation system 208 in operation 708, which retrieves and applies the AR effects and any associated parameters that were previously used by the augmentation system 208 to provide the live display of the AR-enhanced user 312, as described in FIG. 4.

However, unlike FIG. 6, the enhanced video stream received from the augmentation system in operation is not rendered for display, but is saved to a file in operation 710. Since the enhanced video stream is not being displayed to the user, operations 704 to 706 do not need to be performed at a rate that will permit simultaneous video playback, but can instead be performed rigorously to ensure that there is no stuttering in the enhanced video stream as saved in operation 710. This has the advantage that the viewing/reviewing of the enhanced video stream will not have any stuttering, but has the disadvantage that there will be a delay between receipt of user input to view/review the enhanced video stream and its display, the first time playback is requested.

After being saved in operation 710, the enhanced video file is then decoded in operation 712, played back by the video player in operation 714, and the resulting enhanced video stream rendered to the display 316 in operation 716 for viewing by the user. The user thus has an accurate preview of what will be seen by any recipient of the enhanced video file.

If a forward user input has been received in operation 718, the file containing the enhanced video stream is transmitted to a remote location in operation 720, such as the user device 102 of a remote user, to an activity feed on a social networking site or social networking application, or sent as a message to a remote user by the messaging client 104, as specified in the forward user input.

In some examples, operations 704 to operation 710 may commence automatically in the background as soon as recording of the video is complete, provided sufficient resources are available, such as processing power, battery life and so forth. Operations 704 in this case may run as a lower priority task so as not to affect other functioning of the user device 102. Commencing these operations immediately will have the advantage that any delay associated with the rendering to the display in operation 716 will be reduced or possibly eliminated, but has the disadvantage that this will have been unnecessary if user input to discard the file is received without viewing/previewing it.

Figure 8:
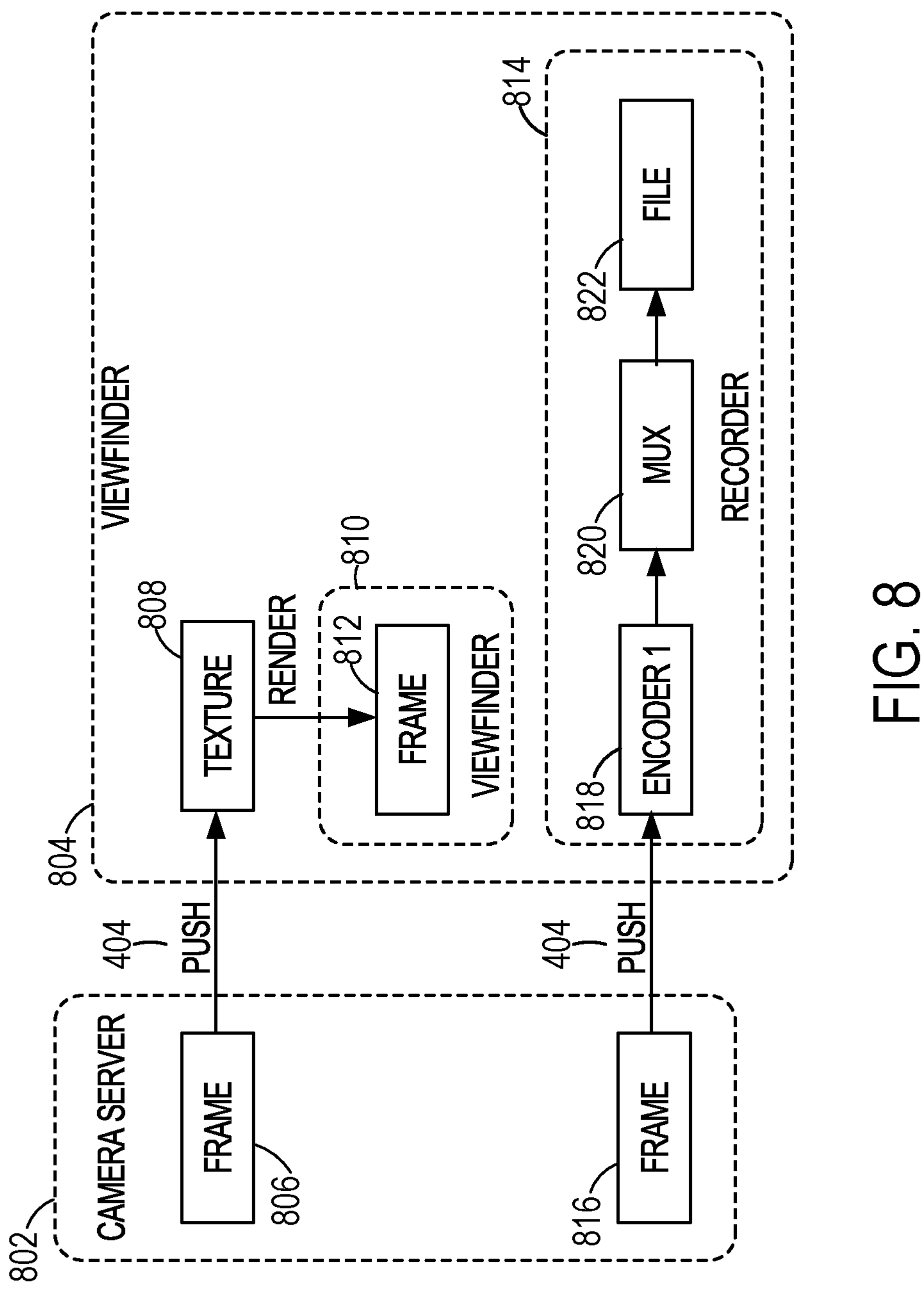
FIG. 8 shows an architecture for an AR-enhanced video in a double camera stream implementation, according to some examples.

FIG. 8 shows an architecture 800 for an AR-enhanced video in a double camera stream implementation, according to some examples. The architecture 800 is embodied in a user device 102, with a camera server 802 being a service provided by the operating system, and an application 804 running on the device.

As can be seen, the camera server 802 provides a frame 806 to the application 804 in a first video stream 404 of camera frames. The application 804 generates a texture 808 from the frame 806, for example by applying augmented reality effects to the frame 806. The application 804 then renders the texture 808 to a frame 812, which is displayed to the user on the display 810.

The camera server 802 also provides a frame 816 to the application 804 in a second video stream 406 of camera frames. The frame 816 may be identical to frame 806, but may also be different, for example of a higher resolution.

The frame 816 is received by a recorder 814, comprising an encoder 818, a multiplexer 820 and a file system 822. The encoder 818 encodes the stream of frames 816 into an appropriate video format and passes it to the multiplexer 820, where it is combined with any associated audio, for example received from a microphone associated with the user device 102. The resulting encoded video stream is then passed to file system 822, where it is saved as a file for future viewing, augmentation, forwarding and so forth.

Figure 9:
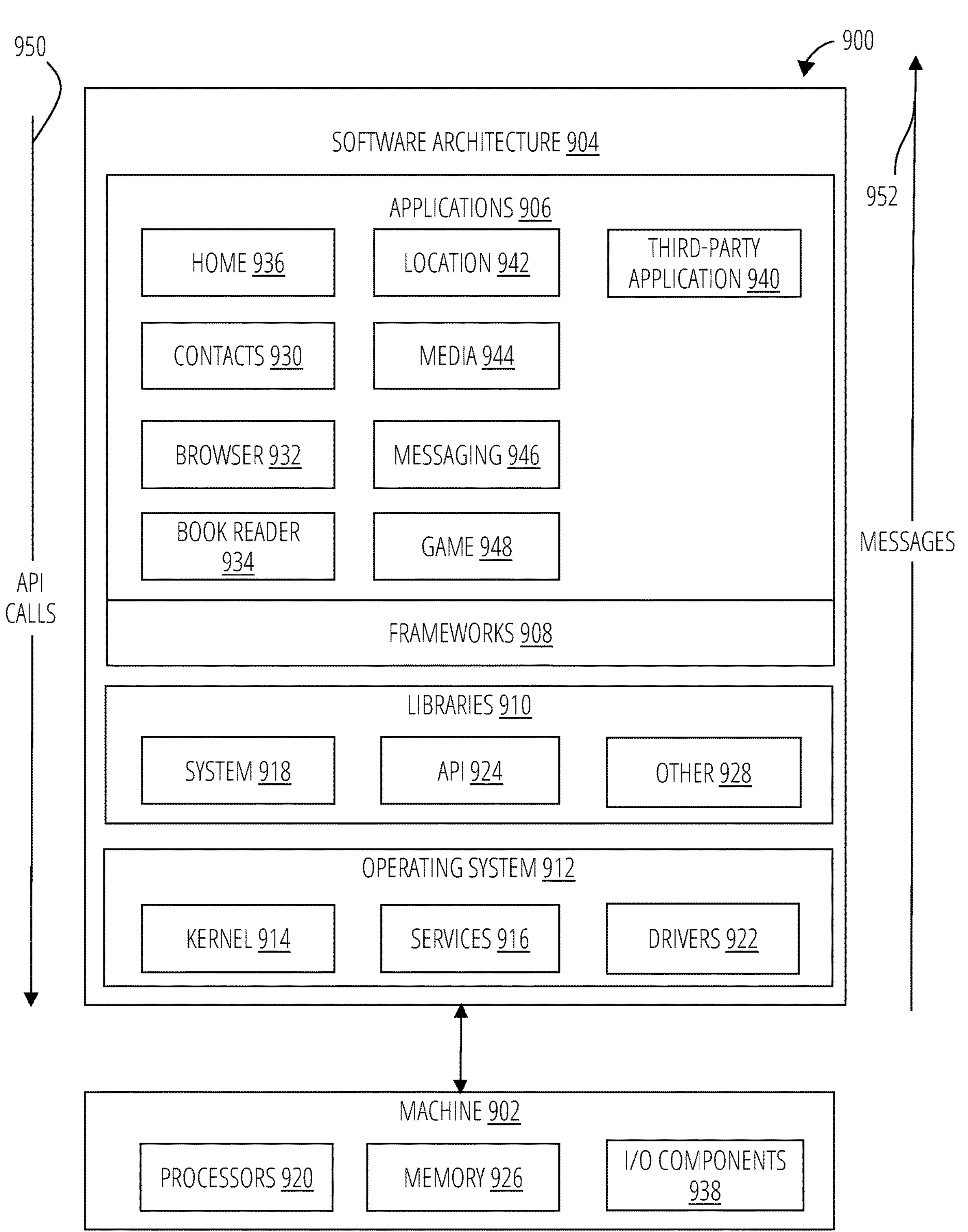
FIG. 9 is a block diagram showing a software architecture within which examples may be implemented.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946 (e.g. messaging client 104), a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

Figure 10:
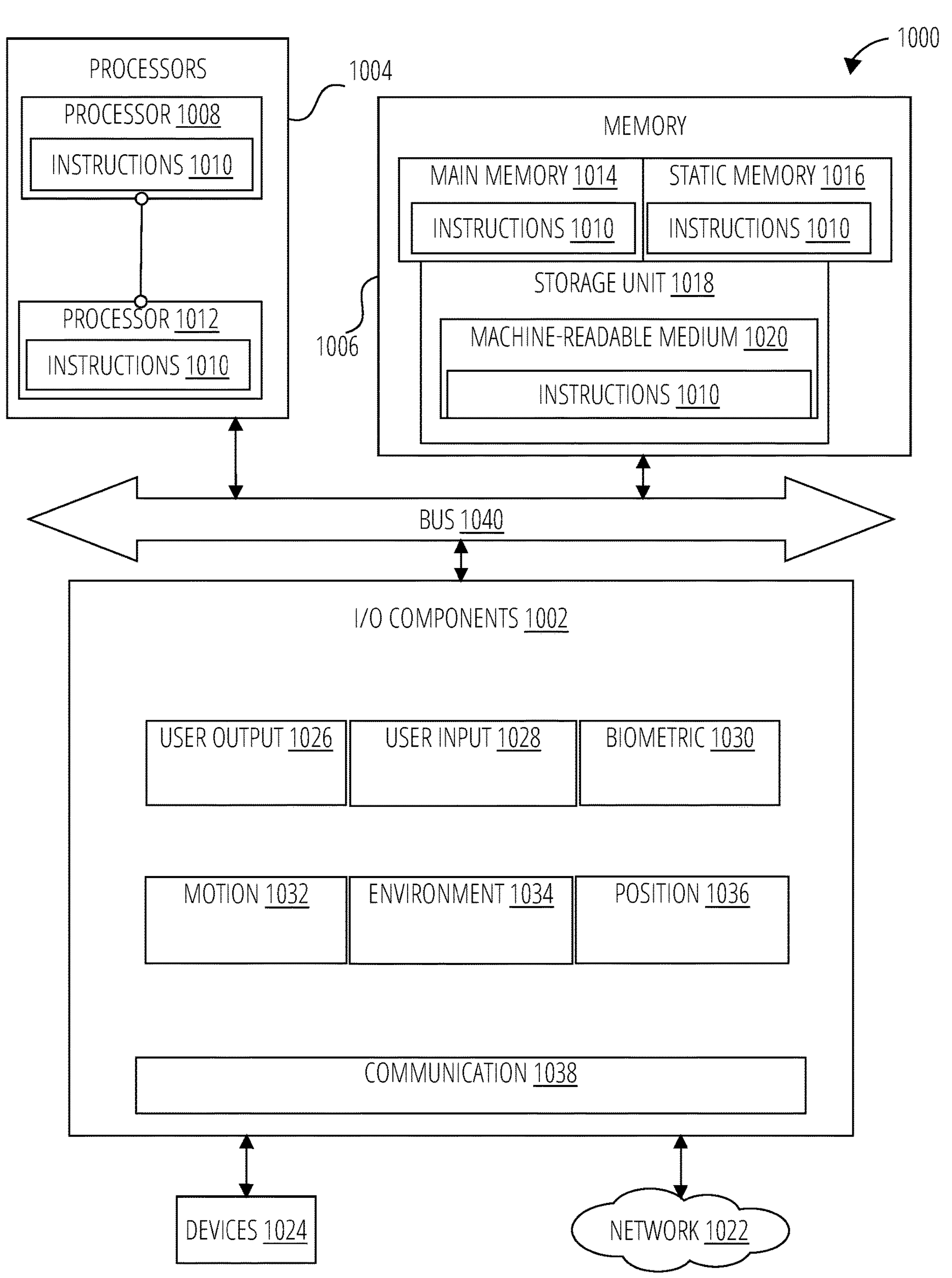
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 (e.g. user device 102) within which instructions 1010 (e.g., software, a program, an application, an applet, an app, or other executable code) for causing the machine 1000 to perform any one or more of the methodologies discussed herein may be executed. For example, the instructions 1010 may cause the machine 1000 to execute any one or more of the methods described herein. The instructions 1010 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein. The machine 1000, for example, may comprise the user device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1002, which may be configured to communicate with each other via a bus 1040.

In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1008 and a processor 1012 that execute the instructions 1010. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1014, a static memory 1016, and a storage unit 1018, both accessible to the processors 1004 via the bus 1040. The main memory 1006, the static memory 1016, and storage unit 1018 store the instructions 1010 embodying any one or more of the methodologies or functions described herein. The instructions 1010 may also reside, completely or partially, within the main memory 1014, within the static memory 1016, within machine-readable medium 1020 within the storage unit 1018, within at least one of the processors 1004 (e.g., within the Processor's cache memory), or any suitable combination thereof, during execution thereof by the machine 1000.

The I/O components 1002 may include a wide variety of components to receive input, provide output, produce output, transmit information, exchange information, capture measurements, and so on. The specific I/O components 1002 that are included in a particular machine will depend on the type of machine. For example, portable machines such as mobile phones may include a touch input device or other such input mechanisms, while a headless server machine will likely not include such a touch input device. It will be appreciated that the I/O components 1002 may include many other components that are not shown in FIG. 10. In various examples, the I/O components 1002 may include user output components 1026 and user input components 1028. The user output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1002 may include biometric components 1030, motion components 1032, environmental components 1034, or position components 1036, among a wide array of other components. For example, the biometric components 1030 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1032 include acceleration sensor components (e.g., accelerometer), gravitation sensor components, rotation sensor components (e.g., gyroscope).

The environmental components 1034 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user device 102 may have a camera system comprising, for example, front cameras on a front surface of the user device 102 and rear cameras on a rear surface of the user device 102. The front cameras may, for example, be used to capture still images and video of a user of the user device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user device 102 may also include a 360° camera for capturing 360° photographs and videos.

Further, the camera system of a user device 102 may include dual rear cameras (e.g., a primary camera as well as a depth-sensing camera), or even triple, quad or penta rear camera configurations on the front and rear sides of the user device 102. These multiple cameras systems may include a wide camera, an ultra-wide camera, a telephoto camera, a macro camera and a depth sensor, for example.

The position components 1036 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1002 further include communication components 1038 operable to couple the machine 1000 to a network 1022 or devices 1024 via respective coupling or connections. For example, the communication components 1038 may include a network interface Component or another suitable device to interface with the network 1022. In further examples, the communication components 1038 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1024 may be another machine or any of a wide variety of peripheral devices (e.g., a peripheral device coupled via a USB).

Moreover, the communication components 1038 may detect identifiers or include components operable to detect identifiers. For example, the communication components 1038 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1038, such as location via Internet Protocol (IP) geolocation, location via Wi-Fi® signal triangulation, location via detecting an NFC beacon signal that may indicate a particular location, and so forth.

The various memories (e.g., main memory 1014, static memory 1016, and memory of the processors 1004) and storage unit 1018 may store one or more sets of instructions and data structures (e.g., software) embodying or used by any one or more of the methodologies or functions described herein. These instructions (e.g., the instructions 1010), when executed by processors 1004, cause various operations to implement the disclosed examples.

The instructions 1010 may be transmitted or received over the network 1022, using a transmission medium, via a network interface device (e.g., a network interface component included in the communication components 1038) and using any one of several well-known transfer protocols (e.g., hypertext transfer protocol (HTTP)). Similarly, the instructions 1010 may be transmitted or received using a transmission medium via a coupling (e.g., a peer-to-peer coupling) to the devices 1024.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

The invention claimed is:

1. A method, executed by one or more processors, for providing image augmentation effects on a device including a display and at least one camera, the method comprising:

receiving a first stream of images captured by the at least one camera and a second stream of images captured by the at least one camera, the second stream of images corresponding to the first stream of images and having a higher resolution than the first stream of images;

applying an augmented reality effect to the first stream of images captured by the at least one camera, to generate an enhanced stream of images, wherein the enhanced stream of images comprises the first stream of images with the augmented reality effect rendered thereon;

displaying in real-time the enhanced stream of images on the display as a viewfinder output while the first stream of images is being received from the at least one camera;

saving the second stream of images to an initial video file, wherein the enhanced stream of images displayed on the display includes the augmented reality effect applied to the first stream of images and the second stream of images is concurrently saved without the augmented reality effect applied thereto;

saving identifying information for the augmented reality effect with the initial video file;

in response to receiving user input, retrieving the augmented reality effect based on the identifying information saved with the initial video file;

applying the augmented reality effect to the second stream of images in the initial video file to generate an enhanced video file, wherein the enhanced video file is a higher quality version of the enhanced stream of images; and transmitting the enhanced video file.

2. The method of claim 1, further comprising:

after displaying the enhanced stream of images on the display while the first stream of images is being received, receiving user input to redisplay the enhanced stream of images on the display; and in response to receiving user input to redisplay the enhanced stream, displaying the enhanced video file.

3. The method of claim 2, further comprising:

saving the enhanced video file.

4. The method of claim 1, further comprising, after completion of the display of the enhanced stream of images on the display:

retrieving the second stream of images from the initial video file;

applying the augmented reality effect to the second stream of images to generate a yet further stream of enhanced images; and saving the yet further stream of advanced images as the enhanced video file.

5. A non-transitory computer-readable storage medium, the computer-readable storage medium including instructions that when executed by a computer, cause the computer to perform operations for providing image augmentation effects on a device including a display and at least one camera, the operations comprising:

receiving a first stream of images captured by the at least one camera and a second stream of images captured by the at least one camera, the second stream of images corresponding to the first stream of images and having a higher resolution than the first stream of images;

applying an augmented reality effect to the first stream of images captured by the at least one camera, to generate an enhanced stream of images, wherein the enhanced stream of images comprises the first stream of images with the augmented reality effect rendered thereon;

displaying in real-time the enhanced stream of images on the display as a viewfinder output while the first stream of images is being received from the at least one camera;

saving the second stream of images to an initial video file, wherein the enhanced stream of images displayed on the display includes the augmented reality effect applied to the first stream of images and the second stream of images is concurrently saved without the augmented reality effect applied thereto;

saving identifying information for the augmented reality effect with the initial video file;

in response to receiving user input, retrieving the augmented reality effect based on the identifying information saved with the initial video file;

applying the augmented reality effect to the second stream of images in the initial video file to generate an enhanced video file, wherein the enhanced video file is a higher quality version of the enhanced stream of images; and transmitting the enhanced video file.

6. The non-transitory computer-readable storage medium of claim 5, wherein the operations further comprise:

after displaying the enhanced stream of images on the display while the first stream of images is being received, receiving user input to redisplay the enhanced stream of images on the display; and in response to receiving user input to redisplay the enhanced stream, displaying the enhanced video file.

7. The non-transitory computer-readable storage medium of claim 5, wherein the operations further comprise, after completion of the display of the enhanced stream of images on the display:

retrieving the second stream of images from the initial video file;

applying the augmented reality effect to the second stream of images to generate a yet further stream of enhanced images; and saving the yet further stream of advanced images as the enhanced video file.

8. A computing device comprising:

at least one camera;

a display;

one or more processors; and a memory storing instructions that, when executed by the one or more processors, configure the device to perform operations for providing image augmentation effects, the operations comprising:

receiving a first stream of images captured by the at least one camera and a second stream of images captured by the at least one camera, the second stream of images corresponding to the first stream of images and having a higher resolution than the first stream of images;

applying an augmented reality effect to the first stream of images captured by the at least one camera, to generate an enhanced stream of images, wherein the enhanced stream of images comprises the first stream of images with the augmented reality effect rendered thereon;

displaying in real-time the enhanced stream of images on the display as a viewfinder output while the first stream of images is being received from the at least one camera;

saving the second stream of images to an initial video file, wherein the enhanced stream of images displayed on the display includes the augmented reality effect applied to the first stream of images and the second stream of images is concurrently saved without the augmented reality effect applied thereto;

saving identifying information for the augmented reality effect with the initial video file;

in response to receiving user input, retrieving the augmented reality effect based on the identifying information saved with the initial video file;

applying the augmented reality effect to the second stream of images in the initial video file to generate an enhanced video file, wherein the enhanced video file is a higher quality version of the enhanced stream of images; and transmitting the enhanced video file.

9. The computing device of claim 8, wherein the operations further comprise, after completion of the display of the enhanced stream of images on the display:

retrieving the second stream of images from the initial video file;

applying the augmented reality effect to the second stream of images to generate a yet further stream of enhanced images; and saving the yet further stream of advanced images as the enhanced video file.

10. The computing device of claim 8, wherein the operations further comprise:

after displaying the enhanced stream of images on the display while the first stream of images is being received, receiving user input to redisplay the enhanced stream of images on the display; and in response to receiving user input to redisplay the enhanced stream, displaying the enhanced video file.

11. The method of claim 1, wherein saving the second stream of images to the initial video file further comprises:

encoding, by an encoder of a recorder, the second stream of images according to a video format;

combining the encoded second stream of images, by a multiplexer of the recorder, with audio to generate a resulting encoded video stream; and saving the resulting encoded video stream, by a file system of the recorder, as the initial video file.

12. The method of claim 11, wherein applying the augmented reality effect to the second stream of images in the initial video file to generate the enhanced video file further comprises:

retrieving the initial video file from the file system; and applying the augmented reality effect to the second stream of images in the initial video file retrieved from the file system.

13. The non-transitory computer-readable storage medium of claim 5, wherein saving the second stream of images to the initial video file further comprises:

encoding, by an encoder of a recorder, the second stream of images according to a video format;

combining the encoded second stream of images, by a multiplexer of the recorder, with audio to generate a resulting encoded video stream; and saving the resulting encoded video stream, by a file system of the recorder, as the initial video file.

14. The non-transitory computer-readable storage medium of claim 13, wherein applying the augmented reality effect to the second stream of images in the initial video file to generate the enhanced video file further comprises:

retrieving the initial video file from the file system; and applying the augmented reality effect to the second stream of images in the initial video file retrieved from the file system.

15. The computing device of claim 8, wherein saving the second stream of images to the initial video file further comprises:

encoding, by an encoder of a recorder, the second stream of images according to a video format;

combining the encoded second stream of images, by a multiplexer of the recorder, with audio to generate a resulting encoded video stream; and saving the resulting encoded video stream, by a file system of the recorder, as the initial video file.

16. The computing device of claim 15, wherein applying the augmented reality effect to the second stream of images in the initial video file to generate the enhanced video file further comprises:

retrieving the initial video file from the file system; and applying the augmented reality effect to the second stream of images in the initial video file retrieved from the file system.

* * * * *